US012277436B2

(12) United States Patent
Wu et al.

(10) Patent No.: US 12,277,436 B2
(45) Date of Patent: *Apr. 15, 2025

(54) INTEGRATING VIRTUALIZATION AND HOST NETWORKING

(71) Applicant: VMware LLC, Palo Alto, CA (US)

(72) Inventors: Junfei Wu, Beijing (CN); Yan Wang, Beijing (CN); Haitao Zuo, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,209

(22) Filed: May 11, 2023

(65) Prior Publication Data
US 2023/0281033 A1    Sep. 7, 2023

Related U.S. Application Data

(63) Continuation of application No. 16/815,162, filed on Mar. 11, 2020, now Pat. No. 11,681,542, which is a continuation of application No. PCT/CN2020/072490, filed on Jan. 16, 2020.

(51) Int. Cl.
*G06F 9/455* (2018.01)

(52) U.S. Cl.
CPC ............ *G06F 9/45558* (2013.01); *G06F 2009/45595* (2013.01)

(58) Field of Classification Search
CPC ....... G06F 9/45558; G06F 2009/45595; H04L 61/2503; H04L 63/0263
See application file for complete search history.

(56) References Cited

U.S. PATENT DOCUMENTS

| 8,560,707 B2 | 10/2013 | Jacob et al. |
| 11,681,542 B2* | 6/2023 | Wu ...................... G06F 9/45558 718/1 |
| 2008/0034167 A1* | 2/2008 | Sharma ................. G06F 3/0622 711/152 |

(Continued)

FOREIGN PATENT DOCUMENTS

WO    2016041421 A1    3/2016

OTHER PUBLICATIONS

Pai, et al., "A Transparent Framework for Enabling Incoming TCP Connections to Hosts Behind a NAT Gateway", IEEE Xplore, copyright 2003, 4 pages.

*Primary Examiner* — Kenneth Tang
(74) *Attorney, Agent, or Firm* — King Intellectual Asset Management

(57) ABSTRACT

The disclosure provides for integrating virtual machine (VM) and host networking, forwarding port data and occupation status to host and VM endpoints. Examples synchronize, by a host agent, port reservations with a guest agent on a first VM on the host; receive an indication that a VM port on the first VM is occupied; based at least on receiving the indication that the VM port is occupied, update the port reservations to include that a host port corresponding to the VM port is occupied; receive incoming external traffic on the host port; and based at least on the port reservations and receiving the incoming external traffic on the host port, route the incoming external traffic to the VM port on the first VM. VM-based application behavior thus appears more similar to that of native applications.

20 Claims, 10 Drawing Sheets

(56) References Cited

U.S. PATENT DOCUMENTS

| | | |
|---|---|---|
| 2009/0292858 A1 | 11/2009 | Lambeth et al. |
| 2013/0148511 A1 | 6/2013 | Banga et al. |
| 2013/0174150 A1 | 7/2013 | Nakajima et al. |
| 2013/0185404 A1 | 7/2013 | Patel et al. |
| 2016/0196158 A1* | 7/2016 | Nipane ............... G06F 9/45558 718/1 |
| 2018/0063036 A1* | 3/2018 | Chandrashekhar ... G06F 15/177 |
| 2018/0159826 A1 | 6/2018 | YiSan et al. |
| 2018/0267816 A1 | 9/2018 | Lin et al. |
| 2019/0306109 A1 | 10/2019 | Masputra et al. |
| 2020/0127891 A9 | 4/2020 | Johnson et al. |
| 2021/0149835 A1 | 5/2021 | Johnsen et al. |
| 2021/0152477 A1 | 5/2021 | Johnsen et al. |
| 2021/0184895 A1 | 6/2021 | Nunes et al. |

\* cited by examiner

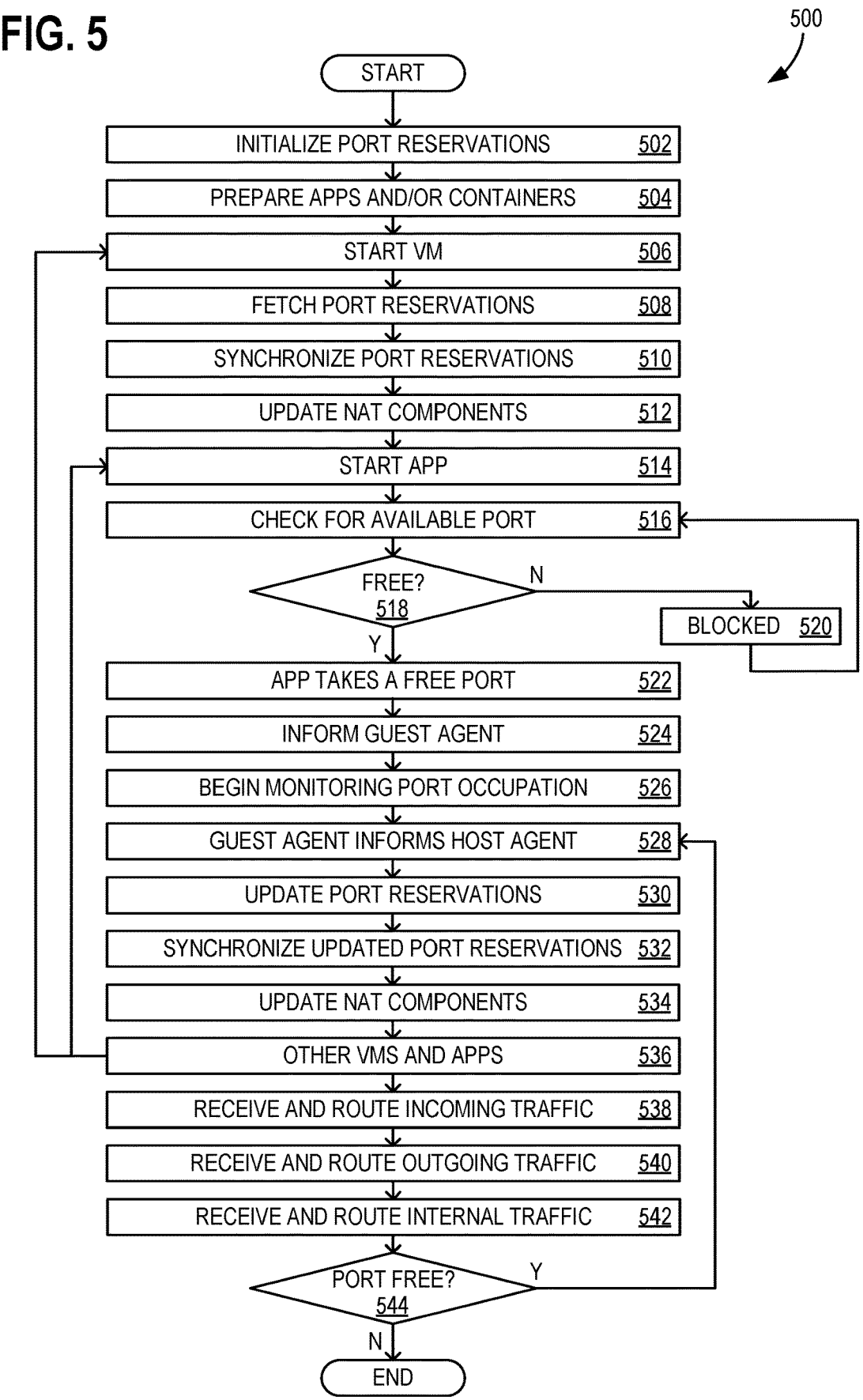

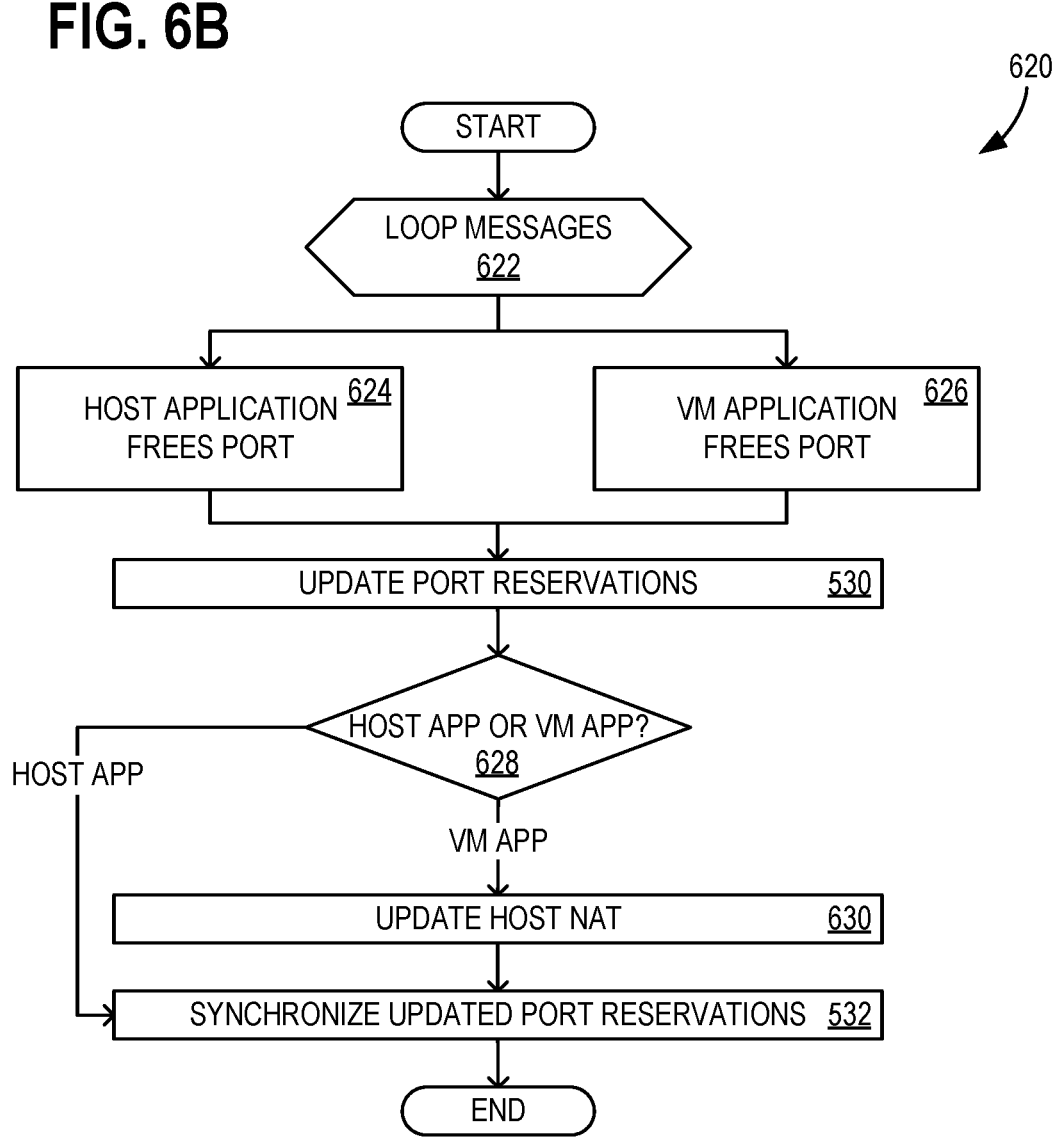

INTEGRATING VIRTUALIZATION AND HOST NETWORKING

CROSS REFERENCE TO RELATED APPLICATION

This application is a continuation of U.S. patent application Ser. No. 16/815,162, filed Sep. 14, 2022, entitled "Integrating Virtualization and Host Networking", International Application No. PCT/CN2020/072490, filed Feb. 1, 2020, entitled "Integrating Virtualization and Host Networking", the entirety each is incorporated herein by reference.

BACKGROUND

Virtual machines (VMs) provide abstractions that are capable of performing tasks, such as running applications, similarly to separate computers, but without the cost of additional hardware. Multiple VMs on a common hardware host may use different operating systems (OSs) and provide beneficial isolation, so that a problem with an application executing within one VM is less likely to negatively impact other applications-if those other applications are executing within other VMs. A hypervisor (or virtual machine monitor, VMM) is capable of managing multiple VMs. The computer hardware on which a hypervisor runs is often called a host machine. Each of the VMs may then be referred to as a guest machine.

A container provides another form of abstraction. Containers offer a logical packaging mechanism in which applications can be abstracted from the environment in which they actually execute; a containerized application executes within a container platform. This decoupling allows containerized application to be deployed easily and consistently, despite variations among the target environments. Similar to VMs, containers permit packaging applications together with libraries and other dependencies, providing somewhat isolated environments. However, whereas a VM provides an abstract machine that uses device drivers targeting the abstract machine and provides an abstract OS, containerized applications share an underlying OS. It is possible to run multiple VMs on a single host, with each VM having its own container platform.

A port is a logical connection between two end points. For example, a virtual private network (VPN) client connects to a VPN server over a port. A socket is one end point of a connection, and a way to "plug in" an application to a logical connection. Each VM will obtain its own internet protocol (IP) address, which will be different than the host machine's IP address. A socket address is the combination of an IP address and a port number. A containerized application not executing within a VM will use the ports of the machine on which it is executing, however each VM will have its own IP address and its own set of ports. Thus, a containerized application executing within a VM will use that VM's ports.

When an application running within a VM needs to communicate with an external resource, the application will use the IP address of the VM. However, because each VM is free to assign its own port numbers to applications, applications executing on different VMs may take common port numbers. For example, a first application executing within a first VM may use port 8080 (of the first VM), even while a second application executing within a second VM is also using port 8080 (of the second VM). However, to communicate beyond the host, for example with a remote node across a network, the host's IP address and ports must be used. If the different applications on the different VMs use the same VM port number, different port numbers will be needed for the host ports. Thus, in order for applications within VMs to communicate with remote nodes across a network, a solution is needed to ensure that incoming network traffic is routed to the proper application within the proper VM.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples synchronize, by a host agent, port reservations with a guest agent on a first VM on the host; receive an indication that a virtual machine (VM) port on the first VM is occupied; based at least on receiving the indication that the VM port is occupied, update the port reservations to include that a host port number corresponding to the VM port number (e.g., having the same port number value) is occupied; receive incoming external traffic on the host port; and based at least on the port reservations and receiving the incoming external traffic on the host port, route the incoming external traffic to the VM port on the first VM.

BRIEF DESCRIPTION OF THE DRAWINGS

The present description will be better understood from the following detailed description read in the light of the accompanying drawings, wherein:

FIG. 5 illustrates a flow chart of exemplary operations associated with integrating virtual machine and host networking;

FIGS. 6A and 6B illustrate additional flow charts of exemplary operations associated with integrating virtual machine and host networking, such as updating port reservations that a port is taken or freed;

DETAILED DESCRIPTION

Figure 1:
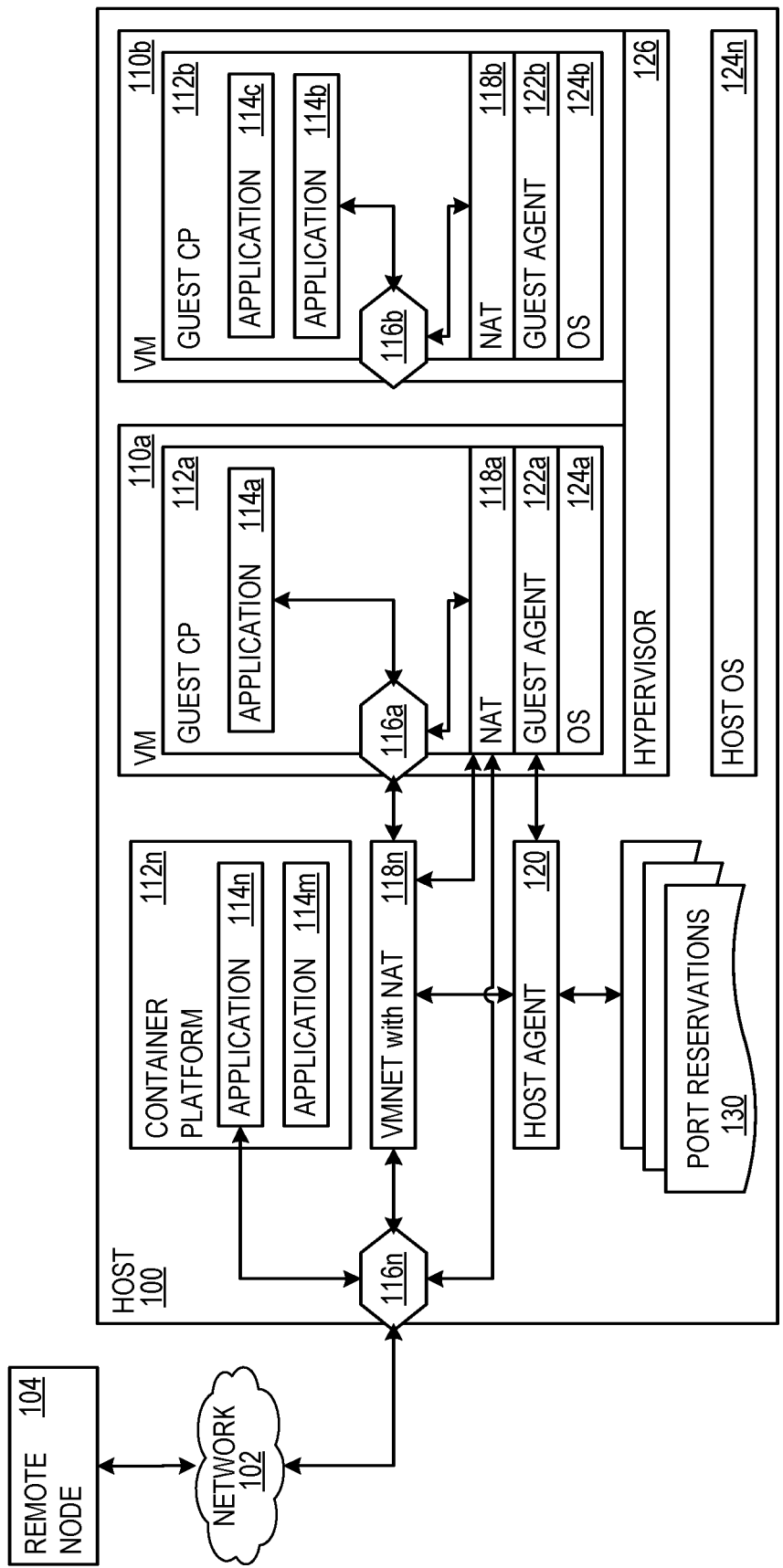
FIG. 1 illustrates a block diagram of an example host that can advantageously integrate virtual machine (VM) and host networking.

Various aspects of the systems and methods described herein provide at least a solution for integrating virtual machine (VM) and host networking, forwarding port data and occupation status to host and VM endpoints. Examples synchronize, by a host agent, port reservations with a guest agent on a first VM on the host; receive an indication that a VM port on the first VM is occupied; based at least on receiving the indication that the VM port is occupied, update the port reservations to include that a host port corresponding to the VM port is occupied (e.g., the ports have the same port number value); receive incoming external traffic on the host port; and based at least on the port reservations and receiving the incoming external traffic on the host port, route the incoming external traffic to the VM port on the first VM. VM-based application behavior is thus more similar to that of native applications.

Aspects of the disclosure improve computing operation efficiency by synchronizing ports across multiple VMs and the host, thereby integrating VM and host networking. For example, aspects of the disclosure improve computing operation efficiency by synchronizing, by a host agent on a host, port reservations with a guest agent on a VM on the host. The resulting port forwarding and port occupation synchronization between host and guests permits containerized applications executing in guests (VMs) appear to be native applications, at least for the purposes of network traffic. When an application occupies a particular port in a VM, that port is also occupied on the host. Other applications, both containerized and native applications, whether in the same VM, or a different VM, or native on the host, are blocked from using that port. This enables applications within guests to appear to native applications, because the port numbers are consistent within the VMs and external to the host.

Aspects of the disclosure operate in an unconventional manner by permitting port assignments in one VM to be visible in other VMs. Aspects of the disclosure further operate in an unconventional manner by introduce a dual network address translation (NAT) structure that renders access to host and/or guest ports seamless. Aspects of the disclosure advantageously improve development and distribution of applications by eliminating the need for extra coding of the applications to handle potential port conflicts.

Aspects of the disclosure further improve computing operation efficiency by deconflicting port reservations (assignments) and routing traffic according to the port reservations. For example, based at least on receiving an indication that a first VM port on a first VM is occupied, port reservations are updated to indicate that a first host port corresponding to the first VM port (e.g., having the same port number) on the first VM is occupied. While the first host port remains occupied, applications on a second VM from are blocked from occupying a second VM port on the second VM, wherein the second VM port on the second VM corresponds to the first host port. Based at least on the port reservations, received incoming external traffic on the first host port is routed to the first VM port on the first VM. In this manner, port reservations are deconflicted and traffic is routed according to the port reservations.

FIG. 1 illustrates a block diagram of an example host 100 that can advantageously integrate VM and host networking. In some examples, host 100 may be implemented as one or more computing devices 900, which is described in relation to FIG. 9. Host 100 is illustrated as running two VMs, a first VM 110a and a second VM 110b under the control of a hypervisor 126. VMs 110a and 110b may also be referred to as guests. VM 110a has an operating system (OS) 124a, and VM 110b has an OS 124b, which may be the same as or different from each other, the same as or different from a native host OS 124n. One or both of VMs 110a and 110b will need to communicate with a remote node 104 across a network 102, which may be the internet, and may use internet protocol (IP) for traffic (e.g., communication messages). Three ports are illustrated, a native host port 116n, a port 116a on VM 110a, and a port 116b on VM 110b. The reservation and use of ports 116n, 116a, and 116b will be as described below.

Host 100 runs a native container platform 112n, which has a native containerized application 114n and another native containerized application 114m. It should be understood that host 100 may have a different number of applications, and they may or may not be containerized. Similarly, VM 110a has a guest container platform 112a, which has a containerized application 114a, and VM 110b has a guest container platform 112b, which has containerized applications 114b and 114c. It should be understood that VMs 110a and 110b may have a different number of applications, and they may or may not be containerized. As illustrated, application 114a will use at least port 116a, application 114b will use at least port 116b, and application 114n will use port 116n. However, for routing traffic to/from remote node 104, both of applications 114a and 114b will also use port 116n. For clarification, the element number 116, as used in 116n, 116a, and 116b, does not refer to an assigned port number, but is instead only a generic element identifier. Applications within VMs 110a and 110b will have their port numbers synchronized not only with each other, but also with native applications that need ports (e.g., applications 114n and 114m).

VM 110a uses a NAT component 118a for routing traffic. NAT allows remapping one IP address space into another by modifying network address information in the IP header of packets while they are in transit across a traffic routing device. NAT enables private IP networks, that use unregistered or private IP addresses (which may not be globally unique), to connect to the internet using a registered IP addresses, before packets are forwarded to another network. A VMnet 118n has NAT capability, provides an application programming interface (API) for VMs 110a and 110b to read and write packets, and assigns IP addresses to VMs 110a and 110b. Applications within VMa 110a and 110b (e.g., applications 114a-114c) will use their VM's IP addresses. However those IP addresses are not suitable for internet traffic. Thus, NAT component 118a permits VM 110a to send and receive external traffic via port 116n. A NAT component 118b similarly permits VM 110b to send and receive external traffic via port 116n. The combination of VMnet 118n (with NAT) and NAT components 118a and 118b forms a dual-NAT structure.

Using the above-described architecture, a host agent 120 works with guest agents 122a and 122b to integrate VM and host networking (e.g., among host 100 and VMs 110a and 110b). Host agent 120 executes natively in host 100, whereas guest agents 122a and 122b each executes within one of VMs 110a and 110b, respectively. Host agent 120 synchronizes port reservations 130 with guest agent 122a on VM 110a and also with guest agent 122b on VM 110b. This synchronization means that access to any port will be automatically redirected to whichever endpoint (any of host 100 and VMs 110a and 110b) first takes the port (e.g., whichever endpoint runs an application that takes the port first), and if one endpoint is using a particular port, another endpoint will not take its own corresponding port (e.g., a port with the same port number). Host agent 120 informs VMnet 118n (directly) and also informs NAT components 118a and 118b, via guest agents 122a and 122b, to add port forwarding rules (e.g., identifies where to route traffic). VMnet 118n forwards port access from host 100 to guests (VMs 110a and 110b). NAT components 118a and 118b forward port access from guests (VMs 110a and 110b) to host 100. The connections illustrated between components of host 100 and VM 110a may be duplicated for VM 110b. However, for clarity of FIG. 1, these are not shown. Additionally, it should be understood that the functionality described for host agent 120 and guest agents 122a and 122b may be integrated into other components.

Figure 2:
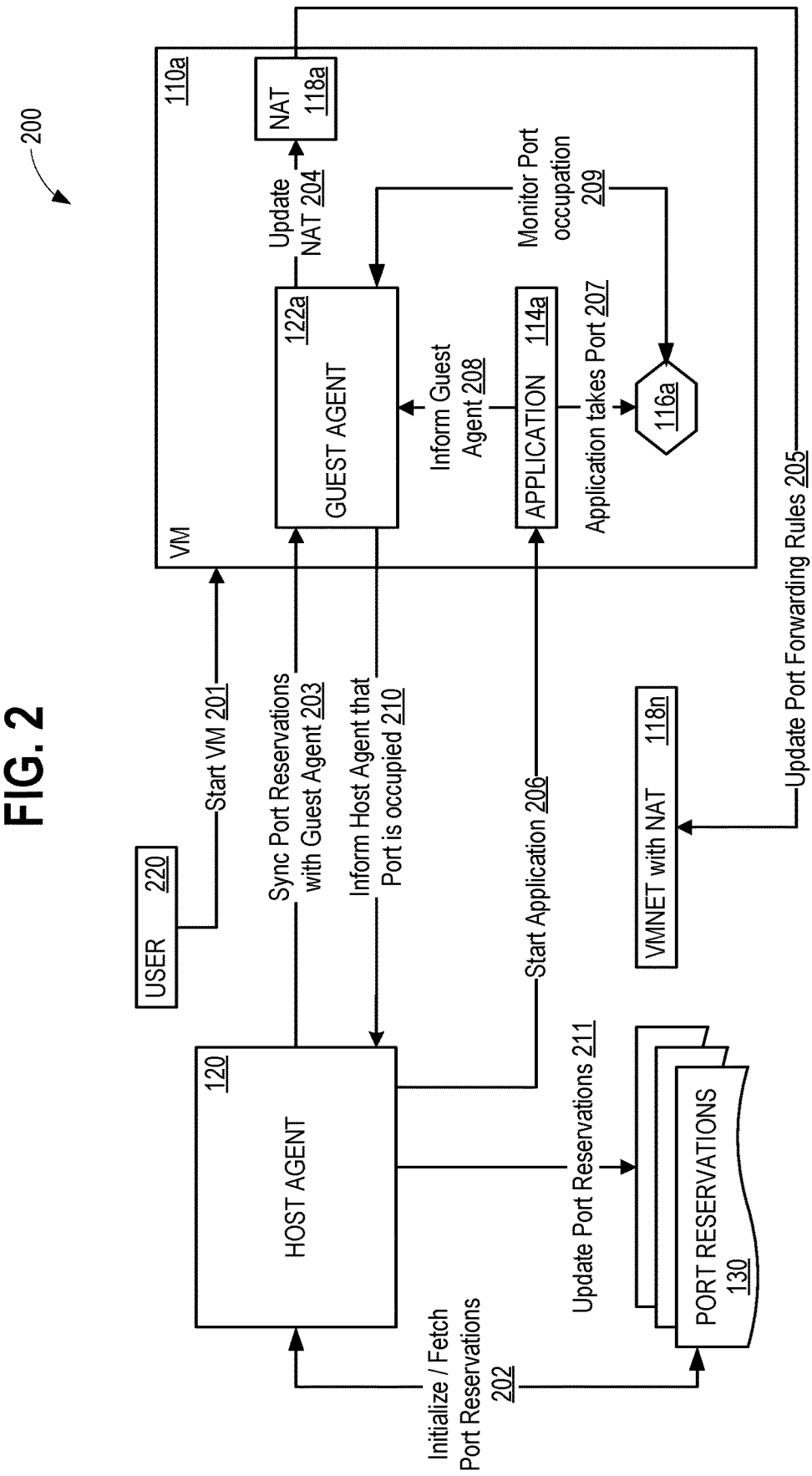
FIG. 2 illustrates a message flow diagram of exemplary messages associated with the host of FIG. 1.
Figure 3:
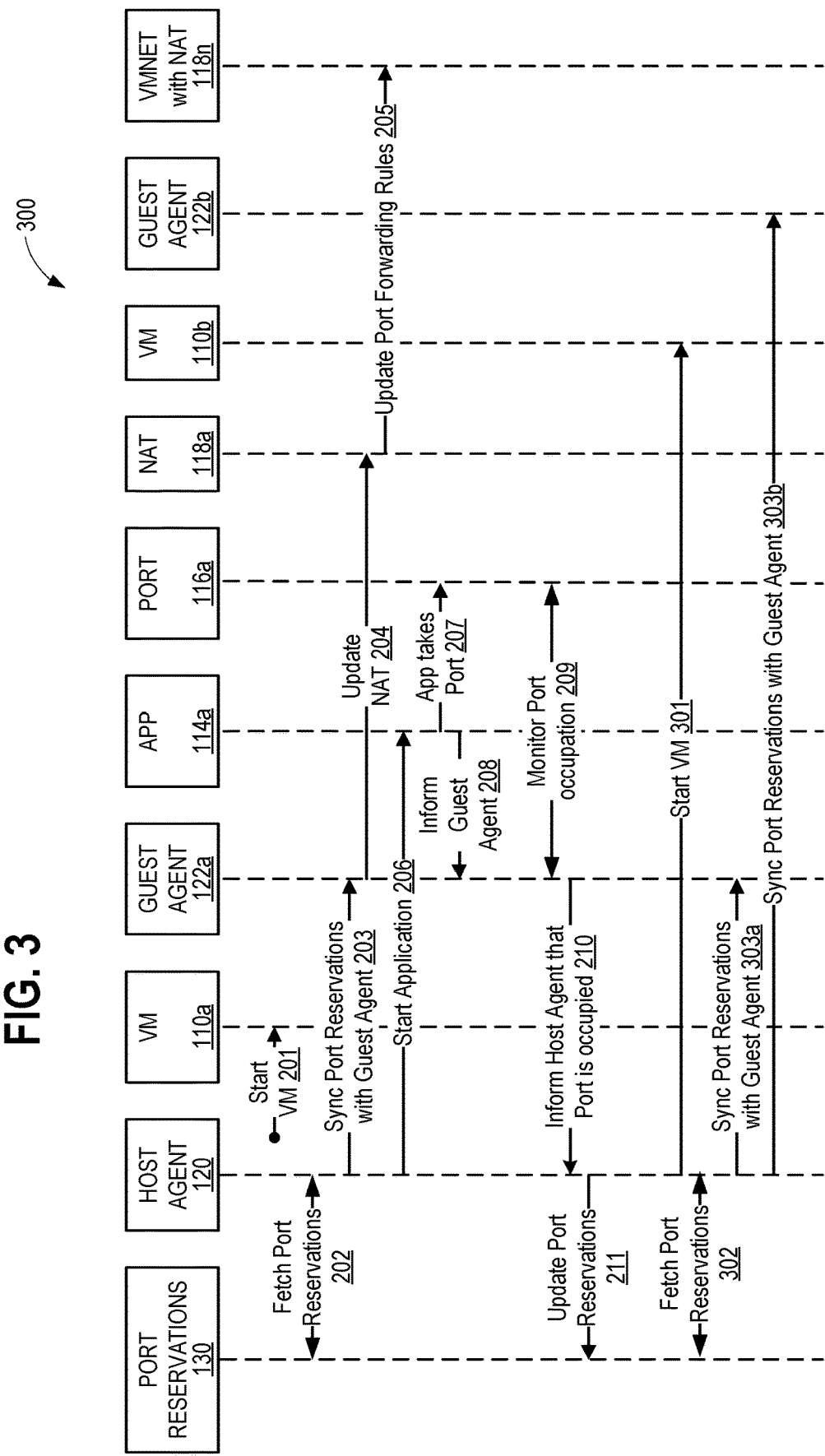
FIG. 3 illustrates an alternative message flow diagram of exemplary messages associated with the host of FIG. 1.

FIG. 2 illustrates a message flow diagram 200 of exemplary messages associated with integrating virtual machine and host networking by host 100 of FIG. 1. FIG. 3 illustrates a message flow diagram 300 that provides an alternative view of message flow diagram 200 and further illustrates additional messages. FIGS. 2 and 3 should be viewed together. A user 220 (or some other process on host 100) starts VM 110a (the first VM) at 201. At 202, host agent 120 initializes or fetches port reservations 130. In some examples, this includes creating a list of ports that are free or occupied. In some examples, initializing port reservations 130 comprises assigning port number ranges based at least on an identity of an expected user (e.g., host 100 or one of VMs 110a and 110b). For example, a first range of port numbers may be assigned to host 100, a second range of port numbers may be assigned to VM 110a, and a third range of port numbers may be assigned to VM 110b. This does not mean that host 100 and VMs 110a and 110b cannot send traffic to port numbers assigned to another user, but instead only that applications on one of host 100 or one of VMs 110a and 110b cannot take port numbers assigned to another user.

At 203, host agent 120 synchronizes port reservations 130 with guest agent 122a on VM 110a. At 204, guest agent 122a updates NAT component 118a. NAT component 118a is now configured to forward traffic according to the synchronized reservations. At 205, NAT component 118a informs VMnet 118n to update port forwarding rules. Alternatively, another component, such as host agent 120 may inform VMnet 118n to update port forwarding rules. User 220, host agent 120 (or some other process on host 100 or VM 110a) starts application 114a on VM 110a, at 206. Application 114a takes port 116a at 207 and informs guest agent 122a at 208. At 209, guest agent 122a begins monitoring occupation of port 116a on VM 110a. Monitoring will continue while port 116a remains occupied, so that, when port 116a is no longer occupied, it can be freed. However, at 210, when port 116a is newly occupied, guest agent 122a informs host agent 120 that port 116a is occupied. Host agent 120 thus receives an indication that port 116a on VM 110a is occupied.

Host agent 120 updates port reservations 130, at 211, with the indication that the port number, that is assigned to port 116a on VM 110a, is occupied. That is, based at least on receiving the indication that port 116a on VM 110a is occupied, host agent 120 updates port reservations 130 to include that a host port corresponding to port 116a on VM 110a is occupied. In this particular example, corresponding ports have the same port number. For example, if port 116a is assigned port number 8080, then port number 8080 will be reserved for VM 110a and neither host 100 nor VM 110b will be permitted to take a port with an assigned port number of 8080. In this manner, while port 116a remains occupied (and thus a host port corresponding to port 116a also remains occupied), applications on VM 110b are blocked from occupying a port on VM 110b that corresponds to the host port (e.g., has the same port number as port 116a). Similarly, applications on host 100 are also blocked from occupying a port on host 100 that corresponds to port 116a.

FIG. 3 continues with additional messaging and operations. At 301, host agent 120 (or some other process on host 100) starts VM 110b (the second VM) at 301. At 302, host agent 120 fetches port reservations 130, which now include the status of port 116a. At 303a, host agent 120 resynchronizes port reservations 130, which may now also include additional port reservations, with guest agent 122a on VM 110a. At 303b, host agent 120 synchronizes port reservations 130 with guest agent 122b on VM 110b. It should be understood that multiple options exist for triggering port reservation synchronization, and the start-up or closure of a VM is only one possibility of multiple options.

The messaging indicated above for operations 204-211 may be repeated for VM 110b and application 114b. Thus, when host agent 120 receives an indication that port 116b on VM 110b is occupied, then, based at least on receiving the indication that port 116b on VM 110b is occupied, host agent 120 updates port reservations 130 to include that a host port corresponding to port 116b on VM 110b is occupied. Further, messaging indicated above for operations 204-211 has an equivalent for freeing a port. For example, based at least on port 116a on VM 110a no longer being occupied, host agent 120 updates port reservations 130 to include that the host port corresponding to port 116a on VM 110a is free. Similar operations are performed for updating port reservations 130 when port 116b on VM 110b is no longer occupied.

Figure 4A:
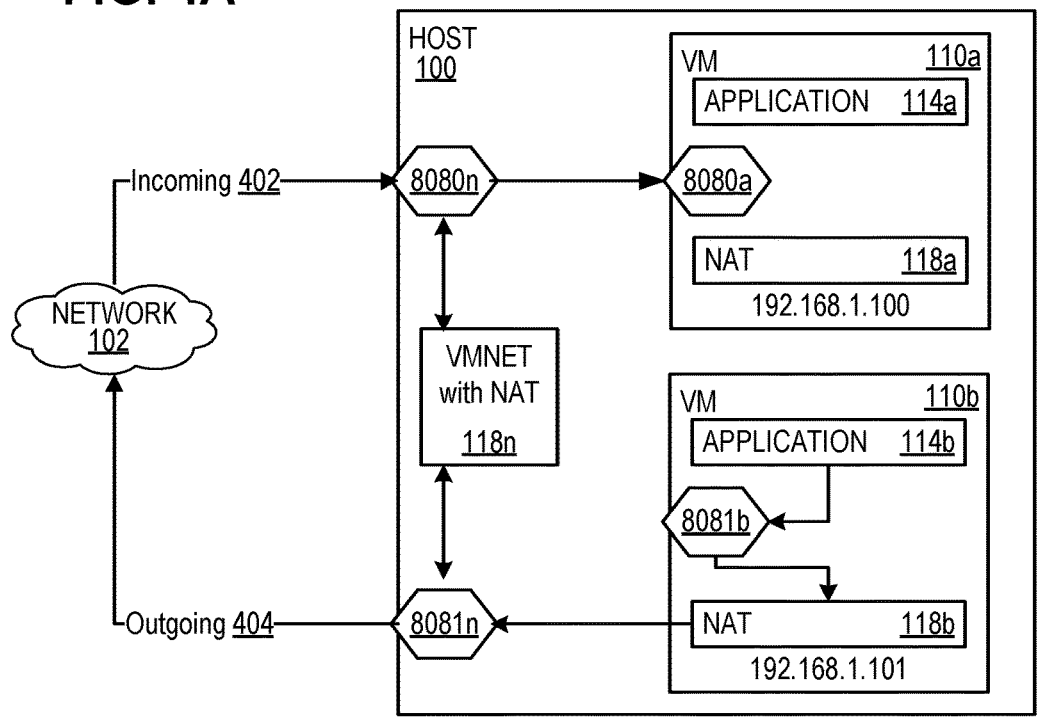
FIGS. 4A and 4B illustrate exemplary traffic routing for integrated virtual machine and host networking.

FIG. 4A illustrates exemplary traffic routing (e.g., port forwarding) for incoming and outgoing external traffic, with integrated virtual machine and host networking. Because of the context here, in FIG. 4A, VM ports are not identified using the prior generic element identifier 116, but are instead identified as ports 8080a, 8080b, and 8080n, to indicate that they have the assigned port number 8080; or as ports 8081b and 8081n, to indicate that they have the assigned port number 8010. A first host port corresponding to port 8080a on VM 110a is port 8080n, indicating that it is a port that is native on host 100. A port on VM 110b corresponding to port 8080a on VM 110a is port 8080b. A second VM port on VM 110b is identified as port 8081b to indicate that it has the assigned port number 8081. The host port corresponding to port 8081b is host port 8081n.

As illustrated, VM 110a has IP address 192.168.1.100, and VM 110b has IP address 192.168.1.101. Prior to application 114a taking port number 8080 and application 114b taking port number 8081, port reservations 130 will indicate that ports numbered 8080 and 8081 are both free. However, in the state indicated in FIGS. 4A and 4B, application 114a is already occupying port number 8080 and application 114b is already occupying port number 8081. Port reservations 130 thus includes at least the entries indicated in Table 1. Both NAT components 118a and 118b, along with VMnet 118n sync to the conditions indicated in Table 1. Each of VMnet 118n in host 100 and NAT components 118a and 118b in VMs 110a and 110b will use port forwarding rules indicated in Table 2.

TABLE 1

| Port Reservations | | |
|---|---|---|
| Port | Endpoint | Status |
| 8080 | 192.168.1.100 | Taken |
| 8081 | 192.168.1.101 | Taken |

TABLE 2

| Port Forwarding Rules | |
|---|---|
| Port | Forwarding Rule |
| 8080 | 192.168.1.100:8080 |
| 8081 | 192.168.1.101:8081 |

Using the port forwarding rules indicated in Table 2, access to port number 8080 is redirected to 192.168.1.100:8080 (port number 8080 on VM 110*a*), and access to port number 8081 is redirected to 192.168.1.101:8081 (port number 8081 on VM 110*b*). When either port number 8080 or 8081 become free, the status in Table 1 changes, and the corresponding port forwarding rule in Table 2 is removed. Because both VMs 110*a* and 110*b* are synchronized to port reservations 130, the port occupations within one VM are visible in the other.

Incoming external traffic 402 is received on host port 8080n. Host port 8080n has an assigned port number 8080 and corresponds to port 8080*a*. Based at least on port reservations 130 and receiving incoming external traffic 402 on host port 8080n, incoming external traffic 402 is routed to port 8080*a* on VM 110*a*. Application 114*a* is thus able to receive incoming external traffic 402 from network 102.

Also shown in FIG. 4*a*, application 114*b* attempts to send outgoing external traffic 404. Outgoing external traffic 404 is received on port 8081*b* on VM 110*b*. Based at least on port reservations 130 and receiving outgoing external traffic 404 on port 8181*b* on VM 110*b*, outgoing external traffic 404 is routed to host port 8081n. Application 114*b* is thus able to send outgoing external traffic 404 to network 102.

Figure 4B:
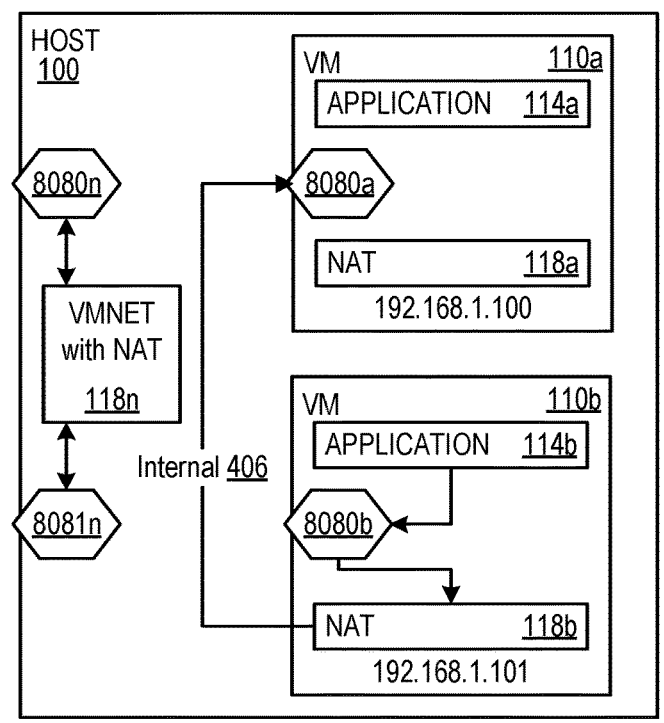

FIG. 4B illustrates exemplary traffic routing for internal traffic, with integrated virtual machine and host networking. In FIG. 4B, application 114*b* attempts to send internal traffic 406 to application 114*a*, using port number 8080. Internal traffic 406 is received on port 8080*b* on VM 110*b*, which corresponds to port 8080*a* on VM 110*a*. Based at least on port reservations 130 and receiving internal traffic 406 on port 8080*b* on VM 110*b*, internal traffic 406 is routed to port 8080*a* on VM 110*a*.

FIG. 5 illustrates a flow chart 500 of exemplary operations associated with integrating virtual machine and host networking. In some examples, the operations of flow chart 500 are performed by one or more computing devices 900 of FIG. 9. Operation 502 includes initializing port reservations. In some examples, initializing port reservations comprises assigning port number ranges based at least on an identity of an expected user (e.g., host 100 or one of VMs 110*a* and 110*b* of FIG. 1). Applications and/or containers are prepared to execute on host 100 in operation 504, and a VM is started in operation 506.

Starting a VM is one possible trigger for operation 508, in which a host agent fetches port reservations (e.g., port reservations 130), although other triggers may be used instead or in addition to starting a VM. Operation 510 includes synchronizing, by a host agent on a host, port reservations with a first guest agent on a first VM on the host. In operation 512, the host agent updates the host NAT (e.g., VMnet 118*n*) and the guest agent(s) update NAT components on their VM (e.g., guest agent 122*a* updates NAT component 118*a* on VM 110*a* and guest agent 122*b* updates NAT component 118*b* on VM 110*b*). This adds the proper configuration to the NAT components, for example by adding port forwarding rules.

An application is started at 514. In some examples, the host agent instructs a guest agent to run an application or a container platform (e.g., guest container platform 112*a* or 112*b*). The application checks for an available (free) port in operation 516. In some examples, the host agent provides this information. In some examples, local information within the VM is used, such as within the VM's NAT component. If, according to decision operation 518, the port is occupied (already taken), then the application is blocked from taking that port, at 520. That is, while that port remains occupied, applications on the VM are blocked from occupying that port.

If, however, that port is free (available), the application takes (occupies) that port on the VM at 522. In operation 524, the application informs guest agent (on its same VM) of the port occupation, and the guest agent begins monitoring the port on the VM in operation 526. In some examples, the guest agent is proactive and can identify port occupation without requiring a message from the application. The guest agent informs the host agent in operation 528. Operation 528 thus includes the guest agent receiving an indication that a port on a VM is occupied. Operation 530 includes, based at least on receiving the indication that the first VM port on the first VM is occupied, updating the port reservations to indicate that a first host port having a same port number value as the first VM port on the first VM is occupied. For example, the port reservations will indicate that the relevant port number is indicated as taken. In some examples, corresponding ports have the same assigned port number. Operations 532 and 534 are similar to operations 510 and 512 described above, although triggered by the update of operation 530.

At 536, operations 514 through 534 are repeated for other applications, and operations 506 through 534 are repeated for other VMs. In second and subsequent passes, operations 510 and 532 includes synchronizing, with the host agent on the host, the port reservations with a second guest agent on a second VM that is running on the host; operation 528 includes receiving an indication that a third VM port on the second VM is occupied; and operation 530 includes based at least on receiving the indication that the third VM port on the second VM is occupied, updating the port reservations to include that a second host port corresponding to the third VM port on the second VM is occupied.

While the ports are occupied, operation 538 includes receiving incoming external traffic on the first host port and, based at least on the port reservations and receiving the incoming external traffic on the first host port, routing the incoming external traffic to the first VM port on the first VM. Operation 540 includes receiving outgoing external traffic on the third VM port on the second VM and, based at least on the port reservations and receiving the outgoing external traffic on the third VM port on the second VM, routing the outgoing external traffic to the second host port. Operation 542 includes receiving internal traffic on a second VM port on a second VM, wherein the second VM port on the second VM corresponds to the first VM port on the first VM (e.g., has the same port number value) and, based at least on the port reservations and receiving the internal traffic on the second VM port on the second VM, routing the internal traffic to the first VM port on the first VM.

Decision operation 544 includes determining whether a port (e.g., the first port) is no longer being occupied. This can occur when an application releases a port, the application is no longer executing (e.g., due to a normal termination or a crash), and/or the VM is no longer executing (e.g., due to a normal termination or a crash). While the first host port remains occupied, applications on other VMs are blocked from occupying the corresponding port. If, however, the port is no longer occupied, flow chart 500 returns to operation 528, in which the guest agent informs the host agent that the port is free. In this return, operation 530 includes, based at least on the first VM port on the first VM no longer being occupied, updating the port reservations to include that the first host port is free.

Figure 6A:
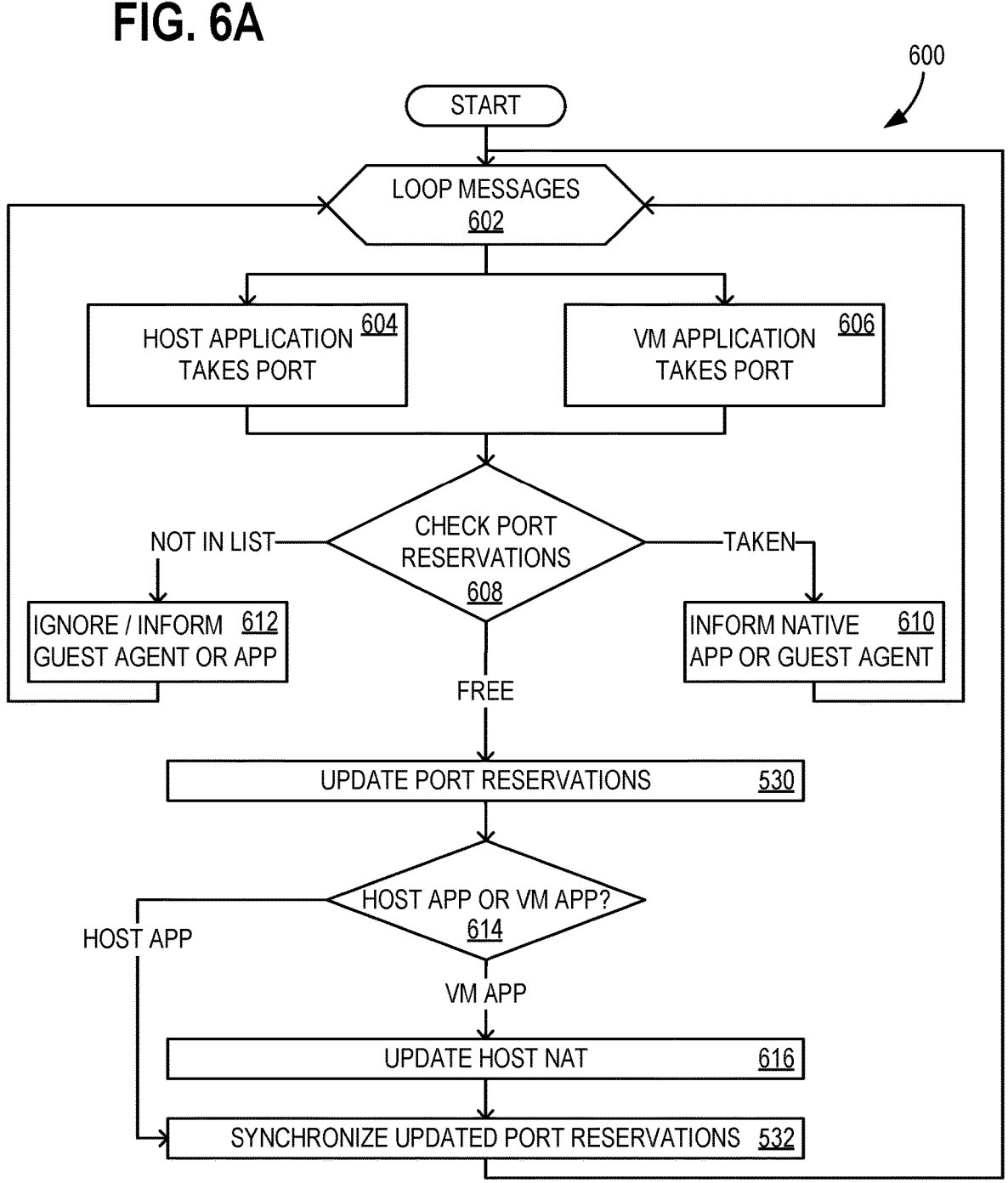

FIG. 6A illustrates a flow chart 600 of exemplary operations performed by a host agent, for example updating port reservations to include that a port is taken or occupied. In some examples, the operations of flow chart 600 are performed by one or more computing devices 900 of FIG. 9. The host agent (e.g., host agent 120) listens to incoming messages in a loop operation 602. In some scenarios, a message 604 is received indicating that a native application (e.g., application 114n or 114m of FIG. 1) has taken a port. In some scenarios, a message 606 is received from a guest agent, indicating that an application executing on a VM has taken a port. Port reservations are checked in operation 608. If the port had already been taken, the native application that had attempted taking the port, or the guest agent, is informed that the port is blocked, in operation 610. The application then attempts taking another port.

In some scenarios, the port is not listed within the port reservations. This may occur, for example, if there is an error in the application. The message is then ignored, or an error message is sent at 612. If the port is free, the host agent proceeds with operation 530, as described for FIG. 5, in which port reservations are updated to reflect that the port has been taken. In some examples, when a native application takes a port, it is not necessary to update the host NAT rules, so a decision operation 614 bypasses operation 616 if a host (native) application took the port. The host NAT is updated in operation 616 to add the appropriate port forwarding rule, and the updated port reservations are synchronized with VMs in operation 532.

FIG. 6B illustrates a flow chart 620 of exemplary operations performed by a host agent, for example updating port reservations to include that a port is freed or no longer occupied. In some examples, the operations of flow chart 620 are performed by one or more computing devices 900 of FIG. 9. The host agent listens to incoming messages in a loop operation 622. In some scenarios, a message 624 is received indicating that a native application has freed a port. In some scenarios, a message 626 is received from a guest agent, indicating that an application executing on a VM has freed a port. The host agent proceeds with operation 530, as described for FIG. 5, in which port reservations are updated to reflect that the port has been freed (rather than taken). In some examples, when a native application frees a port, it is not necessary to update the host NAT rules, so a decision operation 628 bypasses operation 630 if a host (native) application took the port. The host NAT is updated in operation 630 to remove the appropriate port forwarding rule, and the updated port reservations are synchronized with VMs in operation 532.

Figure 7:
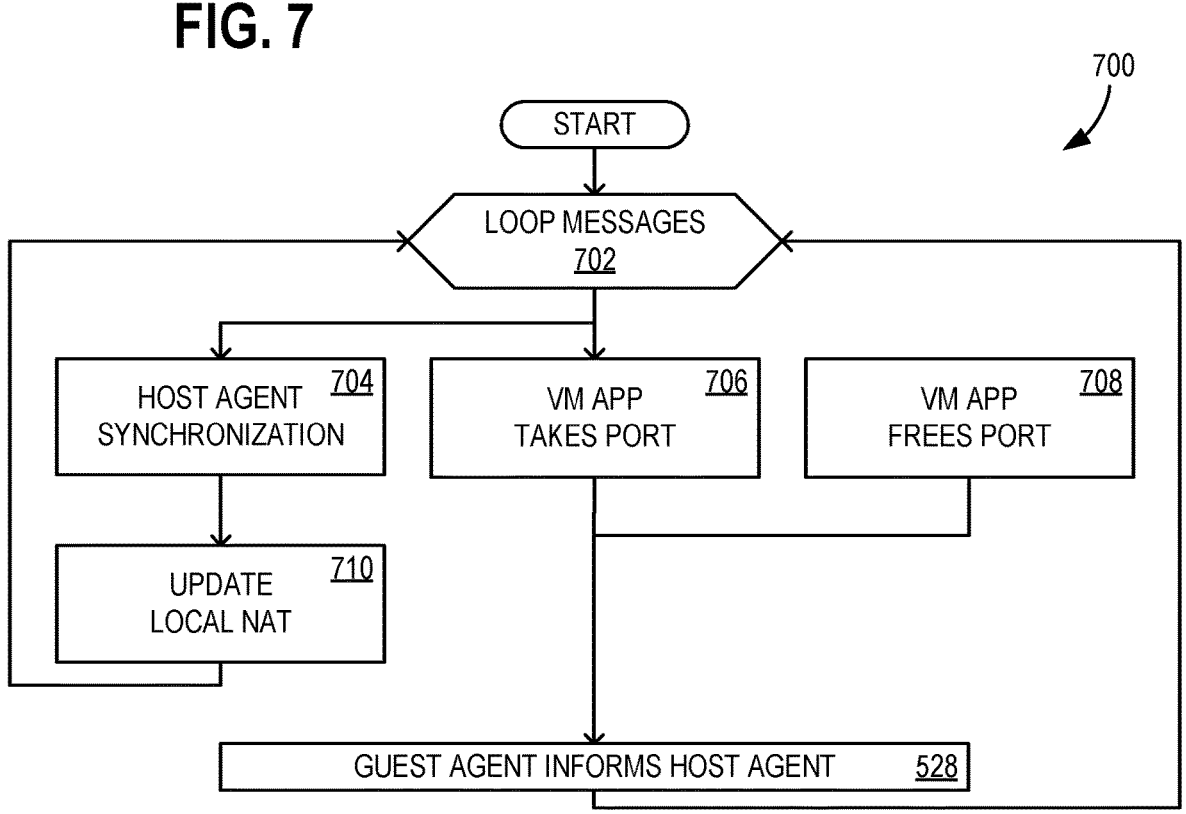
FIG. 7 illustrates an additional flow chart of exemplary operations associated with integrating virtual machine and host networking, such as updating a local NAT component that a port is taken or freed.

FIG. 7 illustrates a flow chart 700 of exemplary operations performed by a guest agent (e.g., guest agent 122a or 122b), for example updating a local NAT component to include that a port is taken or freed. In some examples, the operations of flow chart 700 are performed by one or more computing devices 900 of FIG. 9. The guest agent listens to incoming messages in a loop operation 702. In some scenarios, a message 704 is received from the host agent, for example during operation 510 or 532 of FIG. 5, which indicates that a port has been taken or freed. The local NAT component is updated accordingly, in operation 710.

In some scenarios, a message 706 is received that indicates a local (on the same VM) application has taken a port. In some scenarios, a message 708 is received that indicates a local (on the same VM) application has freed a port. In some examples, message 708 arrives from a component that is monitoring the occupation of the port. For either scenario, the application has taken the port or freed the port, the guest agent informs the host agent in operation 528, as described for FIG. 5.

Figure 8:
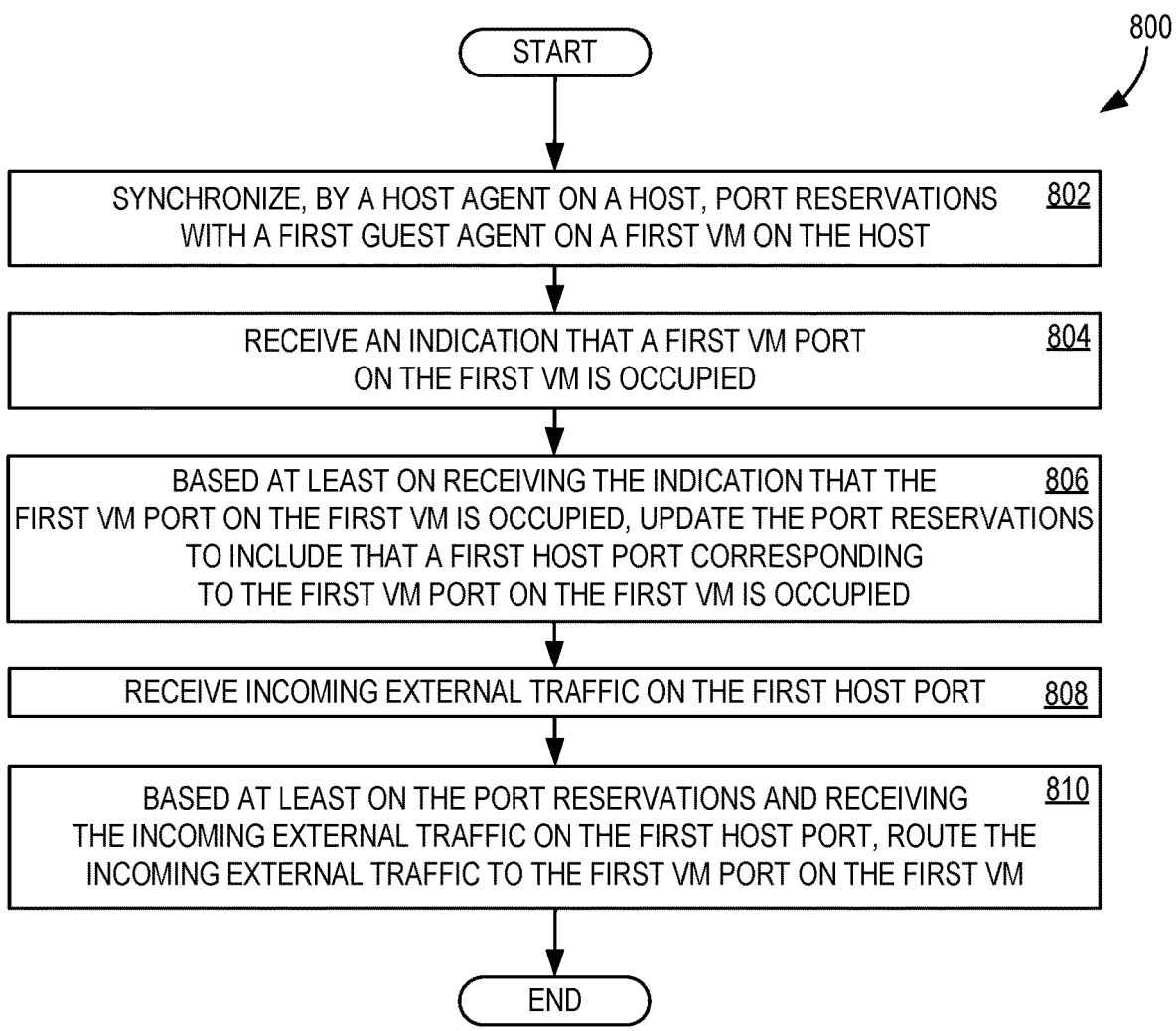
FIG. 8 illustrates another flow chart of exemplary operations associated with integrating virtual machine and host networking.

FIG. 8 illustrates a flow chart 800 of exemplary operations associated with integrating VM and host networking. In some examples, the operations of flow chart 800 are performed by one or more computing devices 900 of FIG. 9. Operation 802 includes synchronizing, by a host agent on a host, port reservations with a first guest agent on a first VM on the host. Operation 804 includes receiving an indication that a first VM port on the first VM is occupied. Operation 806 includes, based at least on receiving the indication that the first VM port on the first VM is occupied, updating the port reservations to indicate that a first host port having a same port number value as the first VM port (e.g., the ports corresponding) on the first VM is occupied. Operation 808 includes receiving incoming external traffic on the first host port. Operation 810 includes, based at least on the port reservations and receiving the incoming external traffic on the first host port, routing the incoming external traffic to the first VM port on the first VM.

Figure 9:
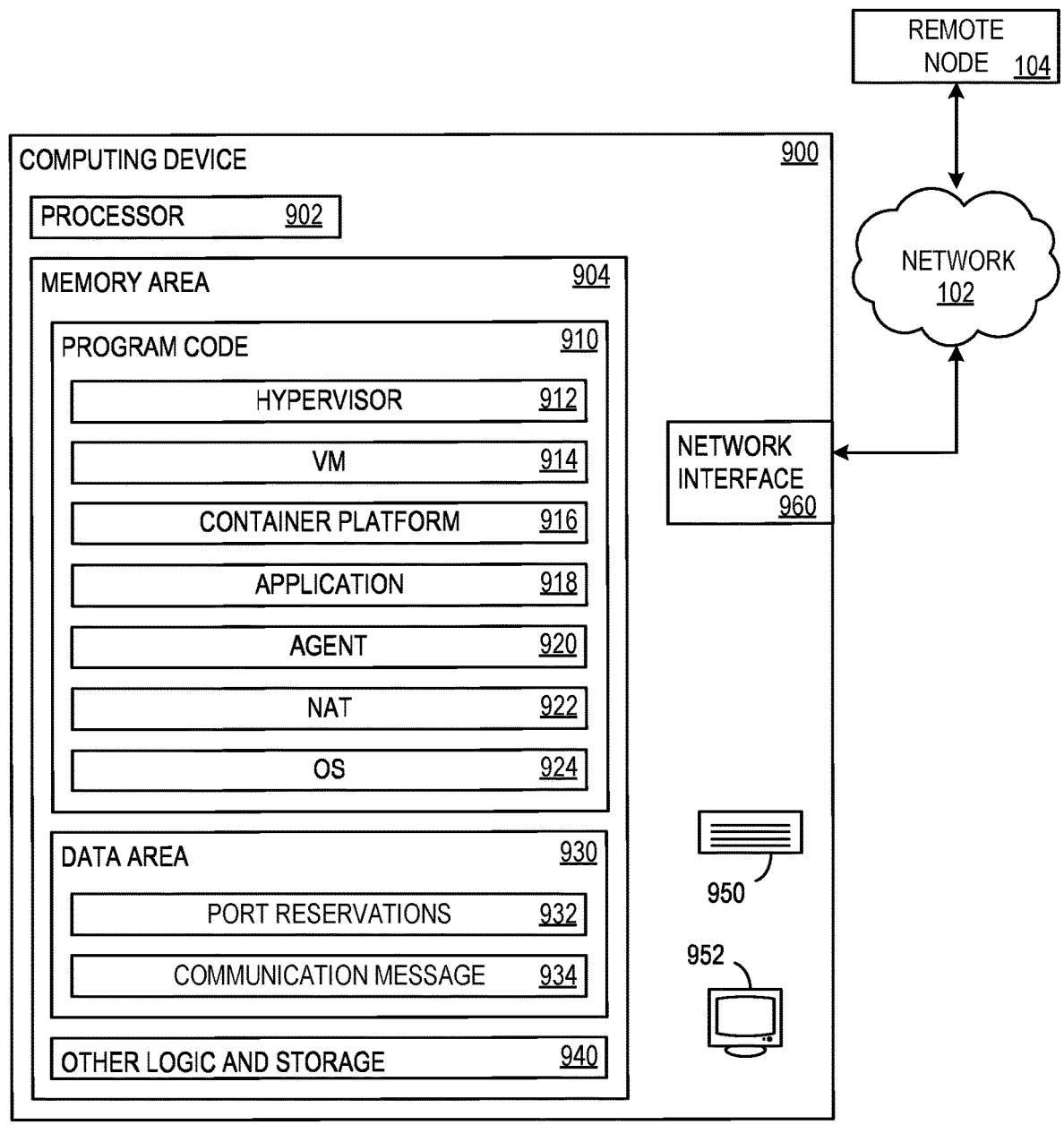
FIG. 9 illustrates a block diagram of a computing device that may be used with the architecture of FIG. 1, according to an example embodiment.

FIG. 9 illustrates a block diagram of computing device 900 that may be used for the computing hardware described herein, such as host 100 and/or remote node 104. Computing device 900 has at least a processor 902 and a memory area 904 (or memory 904) that holds program code 910, a data area 930, and other logic and storage 940. Memory area 904 is any device allowing information, such as computer executable instructions and/or other data, to be stored and retrieved. For example, memory area 904 may include one or more random access memory (RAM) modules, flash memory modules, hard disks, solid-state disks, and/or optical disks.

Program code 910 comprises computer executable instructions, and computer executable components including a hypervisor 912, a VM 914, a container platform 916, an application 918, an agent 920, a NAT component 922, and an OS 924. With reference to FIG. 1, hypervisor 912 may be hypervisor 926; VM 914 may be one of VMs 110a and 110b; container platform 916 may be one of container platforms 112n, 112a, and 112b; application 918 may be one of applications 114n, 114m, and 114a-c; agent 920 may be one of agents 120, 122a, and 122b; NAT component 922 may be one NAT components 118a and 118b or VMnet 118n (with NAT); and OS 924 may be one of OSs 124n, 124a, and 124b. Data area 930 comprises data used by program code 910 including port reservations 932, which may be port reservations 130, and a communication message 934. With reference to FIG. 4, communication message 934 may be one of incoming external traffic 402, outgoing external traffic 404, and internal traffic 406.

Memory area 904 also includes other logic and storage 940 that performs or facilitates other functions disclosed herein or otherwise required of computing device 900. A keyboard 950 and a computer monitor 952 are illustrated as exemplary input/output (I/O) solutions, although it should be understood that alternative I/O components may be used. A network interface 960 permits communication over network 102 with remote node 104.

Computing device 900 represents any device executing instructions (e.g., as application programs, operating system functionality, or both) to implement the operations and functionality described herein. Computing device 900 may include any portable or non-portable device including a mobile telephone, laptop, tablet, computing pad, netbook, gaming device, portable media player, desktop personal computer, kiosk, embedded device, and/or tabletop device. Additionally, computing device 900 may represent a group of processing units or other computing devices, such as in a cloud computing system or service. Processor 902 may include any quantity of processing units and may be programmed to execute any components of program code 910 comprising computer executable instructions for implementing aspects of the disclosure. In some embodiments, processor 902 is programmed to execute instructions such as those illustrated in the figures.

ADDITIONAL EXAMPLES

An example system for integrating virtual machine and host networking comprises: a processor; and a non-transitory computer readable medium having stored thereon program code for transferring data to another computer system, the program code causing the processor to: synchronize, by a host agent on a host, port reservations with a first guest agent on a first VM on the host; receive an indication that a first VM port on the first VM is occupied; based at least on receiving the indication that the first VM port on the first VM is occupied, update the port reservations to indicate that a first host port having a same port number value as the first VM port on the first VM is occupied; receive incoming external traffic on the first host port; and based at least on the port reservations and receiving the incoming external traffic on the first host port, route the incoming external traffic to the first VM port on the first VM.

An exemplary method of integrating virtual machine and host networking comprises: synchronizing, by a host agent on a host, port reservations with a first guest agent on a first VM on the host; receiving an indication that a first VM port on the first VM is occupied; based at least on receiving the indication that the first VM port on the first VM is occupied, updating the port reservations to indicate that a first host port having a same port number value as the first VM port on the first VM is occupied; receiving incoming external traffic on the first host port; and based at least on the port reservations and receiving the incoming external traffic on the first host port, routing the incoming external traffic to the first VM port on the first VM.

One or more exemplary non-transitory computer storage medium have computer-executable instructions that, upon execution by a processor, cause the processor to at least perform operations that comprise: synchronizing, by a host agent on a host, port reservations with a first guest agent on a first VM on the host; receiving an indication that a first VM port on the first VM is occupied; based at least on receiving the indication that the first VM port on the first VM is occupied, updating the port reservations to indicate that a first host port having a same port number value as the first VM port on the first VM is occupied; receiving incoming external traffic on the first host port; and based at least on the port reservations and receiving the incoming external traffic on the first host port, routing the incoming external traffic to the first VM port on the first VM.

Alternatively, or in addition to the other examples described herein, examples include any combination of the following:
corresponding ports have a same port number;
monitoring occupation of the first VM port on the first VM;
based at least on the first VM port on the first VM no longer being occupied, updating the port reservations to include that the first host port is free;
while the first host port remains occupied, blocking applications on a second VM from occupying a second VM port on the second VM, wherein the second VM port on the second VM corresponds to the first host port;
receiving internal traffic on a second VM port on a second VM, wherein the second VM port on the second VM has a same port number value as the first VM port on the first VM;
based at least on the port reservations and receiving the internal traffic on the second VM port on the second VM, routing the internal traffic to the first VM port on the first VM;
synchronizing, with the host agent on the host, the port reservations with a second guest agent on a second VM that is running on the host;
receiving an indication that a third VM port on the second VM is occupied;
based at least on receiving the indication that the third VM port on the second VM is occupied, updating the port reservations to include that a second host port corresponding to the third VM port on the second VM is occupied;
receiving outgoing external traffic on the third VM port on the second VM (e.g., traffic that is coming from the second application and will be routed to the external network client);
based at least on the port reservations and receiving the outgoing external traffic on the third VM port on the second VM, routing the outgoing external traffic to the second host port;
initializing port reservations; and
initializing port reservations comprises assigning port number ranges based at least on an identity of an expected user.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The examples illustrated and described herein as well as examples not specifically described herein but within the scope of aspects of the invention constitute exemplary means for integrating VM and host networking. For example, the elements illustrated in the figures, such as when encoded to perform the operations illustrated in the figures, constitute exemplary means for synchronizing, by a host agent on a host, port reservations with a first guest agent on a first VM on the host; exemplary means for receiving an indication that a first VM port on the first VM is occupied; exemplary means for based at least on receiving the indication that the first VM port on the first VM is occupied, updating the port reservations to indicate that a first host port corresponding to the first VM port on the first VM is occupied; exemplary means for receiving incoming external traffic on the first host port; and exemplary means for based at least on the port reservations and receiving the incoming external traffic on the first host port, routing the incoming external traffic to the first VM port on the first VM.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of integrating virtual machine (VM) and host networking, the method comprising:
   receiving an indication that a first VM port on a first VM is occupied;
   based at least on receiving the indication that the first VM port on the first VM is occupied, updating port reservations to indicate that a first host port corresponding to the first VM port on the first VM is occupied;
   synchronizing, by a host agent on a host, the port reservations with a second VM that is running on the host;
   receiving incoming external traffic on the first host port;
   based at least on the port reservations and receiving the incoming external traffic on the first host port, routing the incoming external traffic to the first VM port on the first VM; and while the first host port remains occupied, blocking the second VM from occupying a second VM port corresponding to the first host port.

2. The method of claim 1, wherein the first host port has a same port number value as the first VM port.

3. The method of claim 1, wherein the first host port corresponding to the first VM port on the first VM is occupied by a first application executing on the first VM, the method further comprising:
while the first host port remains occupied, blocking other applications on the first VM from occupying the first host port corresponding to the first VM port.

4. The method of claim 1, further comprising while the first host port remains occupied, blocking an application on the host or the second VM from occupying the first host port corresponding to the first VM port.

5. The method of claim 1, wherein the first VM has a first application and the second VM has a second application, the method further comprising:
sending, by the second application, internal traffic to the first application using the first VM port; and
based at least on the port reservations and receiving the internal traffic on the second VM port, routing the internal traffic to the first VM port on the first VM.

6. The method of claim 1, further comprising:
upon synchronizing the port reservations:
updating, by the host agent on the host, a host network address translation (NAT) on the host;
updating, by a first guest agent on the first VM, a first NAT component on the first VM; and
updating, by a second guest agent on the second VM, a second NAT component on the second VM.

7. The method of claim 1, further comprising:
adding, by the host agent, port forwarding rules which identify where to route traffic, the port forwarding rules being used by each of the host, the first VM, and the second VM.

8. A computer system for integrating virtual machine (VM) and host networking, the computer system comprising:
a processor; and
a non-transitory computer readable medium having stored thereon program code for transferring data to another computer system, the program code causing the processor to:
receive an indication that a first VM port on a first VM is occupied;
based at least on receiving the indication that the first VM port on the first VM is occupied, update port reservations to indicate that a first host port corresponding to the first VM port on the first VM is occupied;
synchronize, by a host agent on a host, the port reservations with a second VM that is running on the host;
receive incoming external traffic on the first host port;
based at least on the port reservations and receiving the incoming external traffic on the first host port, route the incoming external traffic to the first VM port on the first VM; and
while the first host port remains occupied, block the second VM from occupying a second VM port corresponding to the first host port.

9. The computer system of claim 8, wherein the first host port has a same port number value as the first VM port.

10. The computer system of claim 8, wherein the first host port corresponding to the first VM port on the first VM is occupied by a first application executing on the first VM, wherein the program code is further operative to:
while the first host port remains occupied, block other applications on the first VM from occupying the first host port corresponding to the first VM port.

11. The computer system of claim 8, wherein the program code is further operative to:
while the first host port remains occupied, block an application on the host or the second VM from occupying the first host port corresponding to the first VM port.

12. The computer system of claim 8, wherein the first VM has a first application and the second VM has a second application, wherein the program code is further operative to:
send, by the second application, internal traffic to the first application using the first VM port; and
based at least on the port reservations and receiving the internal traffic on the second VM port, route the internal traffic to the first VM port on the first VM.

13. The computer system of claim 8, wherein the program code is further operative to:
upon synchronizing the port reservations:
update, by the host agent on the host, a host network address translation (NAT) on the host;
update, by a first guest agent on the first VM, a first NAT component on the first VM; and
update, by a second guest agent on the second VM, a second NAT component on the second VM.

14. The computer system of claim 8, wherein the program code is further operative to:
add, by the host agent, port forwarding rules which identify where to route traffic, the port forwarding rules being used by each of the host, the first VM, and the second VM.

15. A non-transitory computer storage medium having stored thereon program code executable by a first computer system, the program code embodying a method comprising:
receiving an indication that a first VM port on a first VM is occupied;
based at least on receiving the indication that the first VM port on the first VM is occupied, updating port reservations to indicate that a first host corresponding to the first VM port on the first VM is occupied;
synchronizing, by a host agent on a host, the port reservations with a second VM that is running on the host;
receiving incoming external traffic on the first host port;
based at least on the port reservations and receiving the incoming external traffic on the first host port, routing the incoming external traffic to the first VM port on the first VM; and
while the first host port remains occupied, blocking the second VM from occupying a second VM port corresponding to the first host port.

16. The non-transitory computer storage medium of claim 15, wherein the first host port has a same port number value as the first VM port.

17. The non-transitory computer storage medium of claim 15, wherein the first host port corresponding to the first VM port on the first VM is occupied by a first application executing on the first VM, the method further comprising:
while the first host port remains occupied, blocking other applications on the first VM from occupying the first host port corresponding to the first VM port.

18. The non-transitory computer storage medium of claim 15, the method further comprising while the first host port remains occupied, blocking an application on the host or the second VM from occupying the first host port corresponding to the first VM port.

19. The non-transitory computer storage medium of claim 15, wherein the first VM has a first application and the second VM has a second application, the method further comprising:
   sending, by the second application, internal traffic to the first application using the first VM port; and
   based at least on the port reservations and receiving the internal traffic on the second VM port, routing the internal traffic to the first VM port on the first VM.

20. The non-transitory computer storage medium of claim 15, the method further comprising:
   adding, by the host agent, port forwarding rules which identify where to route traffic, the port forwarding rules being used by each of the host, the first VM, and the second VM.

\* \* \* \* \*